(12) United States Patent
Johansson et al.

(10) Patent No.: US 6,496,982 B1
(45) Date of Patent: Dec. 17, 2002

(54) DEVICE AND METHOD RELATING TO CABLE TV NETWORKS

(75) Inventors: Albin Johansson, Vienna (AT); Mattias Hyll, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/135,882

(22) Filed: Aug. 18, 1998

Related U.S. Application Data

(63) Continuation of application No. PCT/SE97/00276, filed on Feb. 19, 1996.

(30) Foreign Application Priority Data

Feb. 19, 1996 (SE) ................................. 9600603

(51) Int. Cl.[7] .......................... H04N 7/173; H04N 7/16; H04B 3/00; H04L 25/00; H04L 27/28; H04K 1/10

(52) U.S. Cl. .................. 725/121; 725/98; 725/118; 725/119; 725/122; 725/123; 725/124; 725/125; 725/126; 725/148; 375/257; 375/260

(58) Field of Search .................. 725/98, 118, 119, 725/148, 121–125, 126; 375/257, 260

(56) References Cited

U.S. PATENT DOCUMENTS

| | | | |
|---|---|---|---|
| 4,912,721 A | * | 3/1990 | Pidgeon et al. ............. 375/145 |
| 5,225,902 A | | 7/1993 | McMullan, Jr. |
| 5,371,548 A | * | 12/1994 | Williams .................... 348/473 |
| 5,416,767 A | * | 5/1995 | Koppelaar et al. ........... 370/206 |
| 5,425,050 A | * | 6/1995 | Schreiber et al. ......... 348/384.1 |
| 5,602,835 A | * | 2/1997 | Seki et al. ................... 370/206 |
| 5,608,764 A | * | 3/1997 | Sugita et al. ............... 375/260 |
| 5,610,908 A | * | 3/1997 | Shelswell et al. ........... 370/210 |
| 5,657,313 A | * | 8/1997 | Takahashi et al. .......... 370/491 |
| 5,745,836 A | * | 4/1998 | Williams .................... 725/106 |
| 5,812,523 A | * | 9/1998 | Isaksson et al. ............. 370/208 |
| 5,815,794 A | * | 9/1998 | Williams .................... 725/106 |
| 5,818,813 A | * | 10/1998 | Saito et al. .................. 370/208 |
| 5,825,807 A | * | 10/1998 | Kumar ........................ 370/203 |

FOREIGN PATENT DOCUMENTS

| | | |
|---|---|---|
| DE | 44 07 831 | 9/1995 |
| EP | 0 701 351 | 3/1996 |
| JP | 07283801 | 10/1995 |

\* cited by examiner

*Primary Examiner*—Bhavesh Mehta
*Assistant Examiner*—Jason Salce
(74) *Attorney, Agent, or Firm*—Burns, Doane, Swecker & Mathis, L.L.P.

(57) ABSTRACT

A method and an apparatus transmit and receive information in a cable TV network including at least one base station connected to a branching cable network, branching from the base station to at least two subscribers, provided with transmitters. A unique carrier frequency is assigned to each of the subscriber's transmitters, the carrier frequencies being orthogonal. Signals from the subscriber's transmitters are transmitted simultaneously, received in the base station as a broadband signal, and separated using a common algorithm.

10 Claims, 12 Drawing Sheets

DEVICE AND METHOD RELATING TO CABLE TV NETWORKS

This application is a continuation of International Application No. PCT/SE97/00276, which was filed on Feb. 19, 1996, which designated the United States and which is expressly incorporated here by reference.

The present invention concerns an apparatus and a method for sending and receiving information in a cable TV network.

BACKGROUND AREA

A cable TV network is a branched network in which a base station via an aerial receives TV signals from a satellite, or some other medium, and forwards the signals through a coaxial cable which branches to each individual user. The cable TV network is, second to the telephone network, the network that reaches the largest number of users. Therefore, it would be desirable co use the existing coaxial cable For new broadband services, such as the ordering of pay TV, interactive TV games, mail order services and so on. This requires the network to work in both directions so that the users can both receive information from the base station, called downstream signalling, and transmit information to the base station, called upstream signalling.

These cable TV networks were originally designed for one-way communication through a coaxial cable, but have developed from being merely a point-to-multipoint configuration, with the base station as the only transmitter, to comprising both shorter or longer sections of fiberoptic cable and several transmitters in the net, i.e. a multipoint-to-point configuration.

Choice of components and other dimensioning of the network have been influenced by the requirements that the communication should be one way, point-to-multipoint and inexpensive. With downstream data transmission the levels of noise and disturbance are reasonable and a known protocol may be used for the transmission. In the upstream direction the conditions are different, as the network is not designed to work in this direction. Noise from components and disturbances picked up by defective network elements are added from all branches of the network up to the base stations This problem is caused by the multipoint-to-point configuration and is called noise funnelling. In addition, there are more narrowband disturbances in the upstream band. Owing to this the same protocol cannot be used when transmitting upstream.

Digital information can be transmitted through the TV cable via a modem, which converts the information to a modulation of an analogue carrier wave, with a carrier frequency. Point-to-point configurations with transmission via modems are common in data communication and may even be used in cable TV networks. The disadvantage is however that in the base station one modem per user must be handled. With many users per base station this can become both an expensive and a time consuming solution.

When transmitting via a modem through the same cable, the transmissions must be multiplexed in time or frequency to avoid clashing in the cable, as described in "CATV Return Path Characterization for Reliable Communications", Charles A. Eldering et al., IEEE Communications Magazine, August 1995. With time multiplexing the different transmitters can transmit during different time slots to the same receiver, and a multipoint-to-point configuration can be obtained. One problem with this is that each transmitter then uses the whole bandwidth of the utilized cable TV channel, and a narrowband disturbance somewhere in the band may destroy the entire transmission. Time multiplexing also leads to limited flexibility since each transmitter needs the whole frequency band and can only send during specific time slots. Each transmitter can also only be handled during a certain time period in the base station, which may cause problems if the number of transmitters is large. Even with conventional frequency multiplexing the high levels of disturbance in the upstream band cause problems at the receiver. Apart from this, each channel must be filtered out with a large number of filters, and it is difficult and costly to make these filters sufficiently narrowband. This means that the carrier frequencies cannot be placed too close to each other, which limits the number of carrier frequencies that can be used in the cable TV channel.

U.S. Pat. No. 5,225,902 describes a multiple carrier wave system, that is, a system for upstream signalling with multiple carrier waves, in the cable TV network. The problem of disturbances can then be solved through the base station monitoring the received signals and selecting a number of carrier frequencies which have the lowest disturbance level. These selected frequencies have no mutual correlation, but are selected on the basis of the current disturbance conditions: As the disturbance conditions vary over the day, the received signals are monitored continually and the frequency of the carrier wave is automatically changed when necessary.

The best carrier frequencies are communicated to the users, who then all send on the same, selected, best frequencies. In this way it is ensured that a number of carrier frequencies having the lowest disturbance level are always used, and the use of several carrier frequencies also makes the transmission more secure, as the probability that one of the signals reaching the recipient in a readable state increases. This method however requires some kind of time multiplexing so that the transmissions do not clash with each other, which would result in the problems described above.

U.S. Pat. No. 5,371,548 A and U.S. Pat. No. 5,425,050 both describe the use of OFDM within cable TV technology, but only for downstream signalling. It has been generally assumed that this solution would not work for upstream signalling. For example, EP 701 351 A2 discards this solution because the burst character of the upstream communication would make it too difficult to determine the phase of the received signals.

SUMMARY

One problem when transmitting information in cable TV networks is the large number of modems needed if one modem is placed with each user, and one for each user in the base station. Admittedly, these modems can communicate through the TV cable according to various known protocols, but the result will be a point-to-point configuration, and, since the base station will hold a considerable number of modems, the solution will be expensive and lead to time-consuming handling of the many modems.

With multipoint-to-point communication the base station must be able to determine which user is transmitting. For example frequency or time multiplexing may be used. Both types of multiplexing lead to a loss in transmission capacity, in time and in frequency, respectively. Time multiplexing gives limited flexibility and conventional frequency multiplexing requires a large number of very narrowband filters.

One object of the invention is to provide a quick, flexible and reliable transmission of information through cable TV networks with multipoint-to-point configuration in the upstream direction, i.e. in the direction towards the base station.

A further object of the invention is to overcome the problems associated with conventional frequency multiplexing, i.e. to reduce the number of filters needed in the receiver of the base station and to achieve a frequency multiplexed transmission with closely spaced carrier frequencies and thus a high degree of utilization of the frequency band used.

Another object of the invention is to compensate for differences in propagation time which may occur between signals from different users.

Further it is an object of the invention to achieve reduced sensitivity to disturbances affecting transmission.

The above mentioned objects are achieved in a method which has acquired the characteristics mentioned in claim 1. Further characteristics and developments of the invention and an apparatus for carrying out the method are stated in the other patent claims.

According to the invention an apparatus and a method for transmission and reception of information in cable TV networks are provided in which each user transmits on a separate carrier frequency. The carrier frequencies are mutually orthogonal, so that the contribution of each carrier wave to the next one equals zero, and the separate channels can be separated through computation of at least one common algorithm, e.g. at least one FFT (Fast Fourier Transform). This FFT decodes all transmitting channels simultaneously so that all users can transmit at the same time. This ensures a fast and reliable transmission in the multipoint-to-point configuration.

According to the invention, the sensitivity to disturbances caused by time multiplexing is reduced. The FFT also reduces the number of different filters that would be needed if each channel was to be filtered out individually, which is the case in conventional frequency multiplexing.

As the frequencies are orthogonal and do not influence each other during separation with the FFT, they may be placed very close to each other in the utilized frequency band.

Carrier frequencies with excessive disturbances may be rejected in the case of changed disturbance conditions, but the frequencies used always maintain their mutual correlation. This correlation is here described as the signals being orthogonal, but they could also have some other kind of correlation enabling a common separation of the different transmission channels with at least one common algorithm.

Further, the invention provides a compensation for differences in propagation time that may occur between signals from different transmitters.

BRIEF DESCRIPTION OF THE DRAWINGS

To enhance the understanding, and the implementation, of the present invention, it will be described below by way of examples and with reference to the enclosed drawings, in which like elements are denoted with the same reference numerals, and in which.

DETAILED DESCRIPTION OF A PREFERRED EMBODIMENT

Network Architecture

Figure 1:
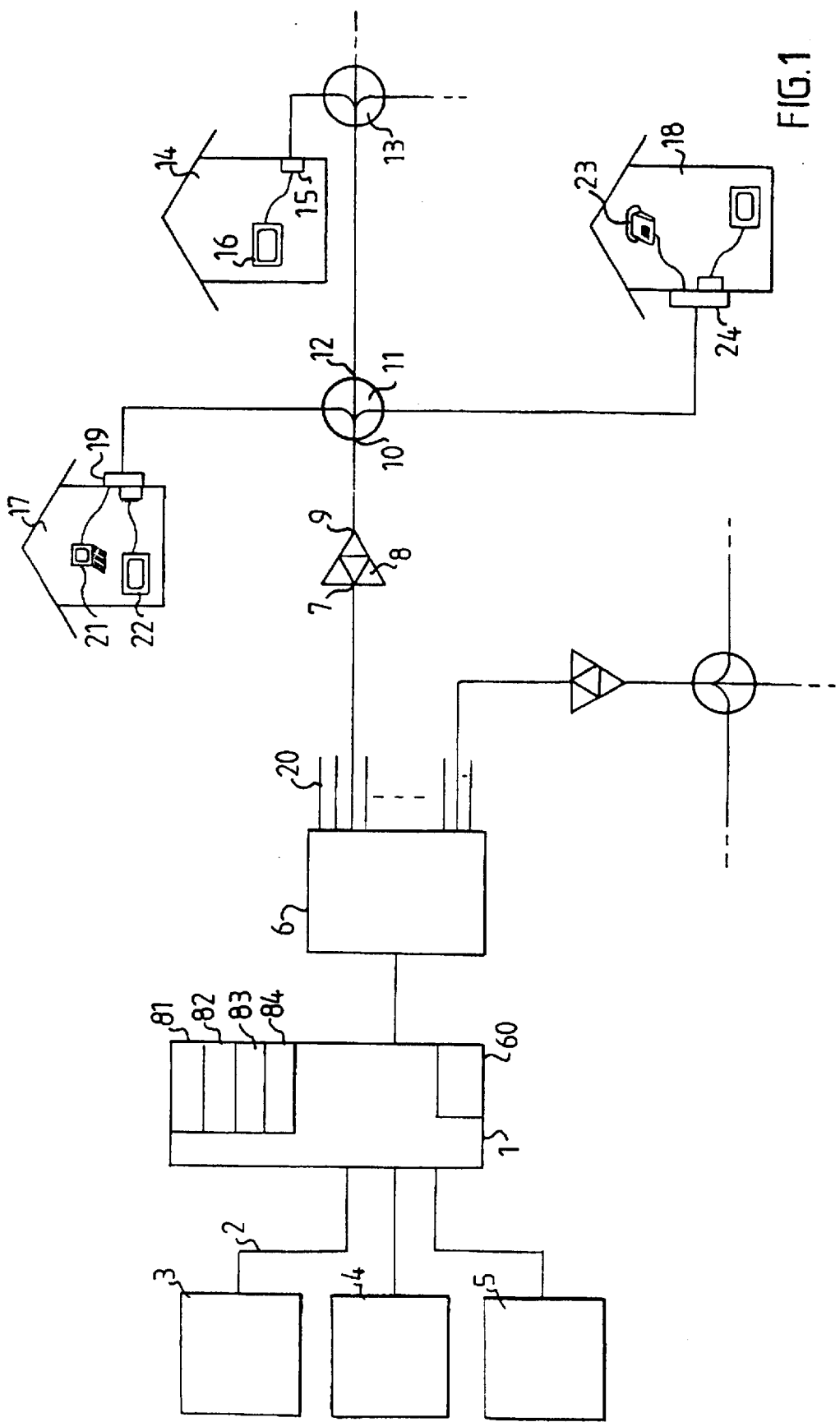
FIG. 1 shows a network architecture for a cable TV network in accordance with a preferred embodiment of the invention.

FIG. 1 shows a network architecture for a cable TV network in accordance with a preferred embodiment of the invention. A base station 1 is connected to an aerial 3 through a cable 2. The cable 2, as well as other connections to the base station 1, may, for example, be optical cable: coaxial cable or waveguides. The base station 1 is also connected to a storage unit 4, a network connection 5 and a network unit 6, which may be parts of the base station itself. From the network unit 6 a number of similar branches 20 extend, made up for example of coaxial cables.

In a branch 20 shown in the figure the network unit 6 is electrically connected through a coaxial cable with one pole 7 of a double direction amplifier 8. The other pole of the amplifier 9 is electrically connected to a first pole, 10 of a first outlet device 11, on which a second pole 12 is connected though a second outlet device 13 to a first subscriber 14. A second and a third subscriber 17 and 18 are each connected directly to one pole on the first outlet device 11.

Each branch in the network can comprise a number of double direction amplifiers, outlet devices and subscribers with various types of connections to the network. At the first subscriber 14 a TV receiver 16 is connected to the network via a directed connector 15, whereas at the second subscriber 17 the network connection is made through an interface 19 for broadband services, to which a computer 21 and a TV receiver 22 are connected. At the third subscriber 18 a telephone 23 is connected to the network through an interface 24 for broadband services.

Downstream Transmission

In the base station 1 signals from a number of different sources are combined for downstream transmission towards the subscribers. The sources can comprise satellite transmissions received by the aerial 3, stored information from the storage unit 4 and information transmitted from other networks or base stations through the network connection 5.

If the base station 1 and the network unit 6 are at a distance from each other, the signals between them may be transmitted by way of optical fibres. These, and other optical connections in the network, may be single mode fibres, using a highly linear optic modulator with wavelengths of e.g. 1310 nm or 1150 nm, and both lasers with distributive feedback and external modulators may be used.

During transmission of video signals downstream towards the subscribers, the network unit 6 converts the optic signals to electric ones, amplifies them and transmits them to the coaxial cables 20 using e.g. an RF modem. The signals are amplified as needed along each cable, in double direction amplifiers. A part of the signal power is branched to each subscriber using the outlet devices 11, 13.

The base station 1 or the network unit 6 comprises means 60 for subchannel allocation. In these means 60 at least one frequency is allocated to each subscribe. who, on a common calling channel, has requested frequency allocation, and notification about these allocated frequencies is sent to every subscriber through a downstream channel.

At the subscribers 14, 17, 18, the signals are received by the directed connector 15, the interface 19 and the interface 24 for broadband services.

Upstream Transmission

During upstream transmission from the subscriber the signals are multiplexed onto the coaxial cable. The double direction amplifiers 8 amplify the signals as needed along the cable, and the multiplexed and, when needed, amplified signals are transmitted to the network unit 6, which combines the signals from a number of branches in the network and transmits them to the base station 1, if applicable converted to optical signals. The base station 1 receives the signals, interprets them and processes the information in the signals. If the network is connected to other networks, the base station, if and when needed, transmits notifications to the other networks, through the network connection 5.

The QPSK Transmitter at the Subscriber

Figure 2:
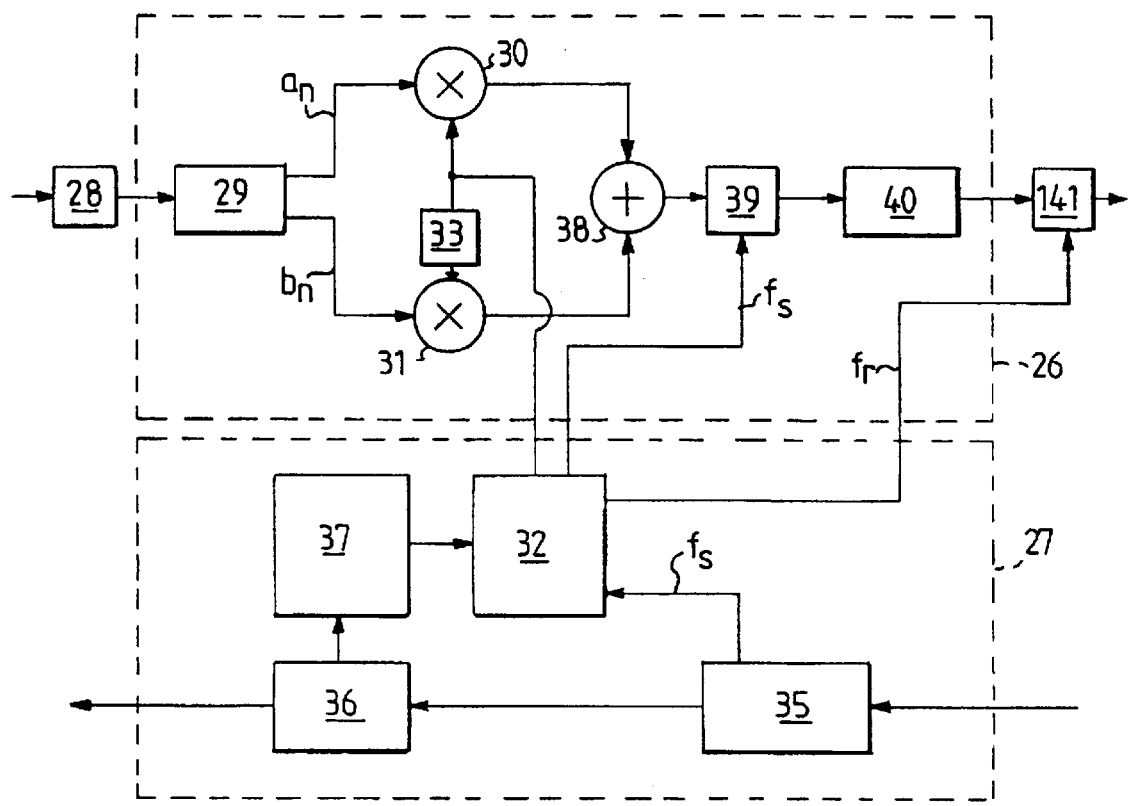
FIG. 2 shows the structure of a QPSK transmitter (QPSK= Quadri Phase Shift Keying), of which each subscriber can have one or more, and relevant parts of a downstream receiver.

FIG. 2 shows the structure of an upstream QPSK transmitter 26, (QPSK=Quadri Phase Shift Keying) of which each subscriber may have one or more, and relevant parts of a downstream receiver 27. Both can for example be part of the interfaces 19, 24 for broadband services. The information that the subscriber wishes to transmit upstream is entered, for example through the keyset of the telephone or the computer or some other device for entering information (not shown) connected to the interface 19, 24. The subscribers that are connected solely through a directed connector 15 cannot transmit information upstream. The directed connector 15 has a too high attenuation is the upstream direction in order to prevent possible reflection in the network, as it is designed for downstream transmission only.

Figure 3:
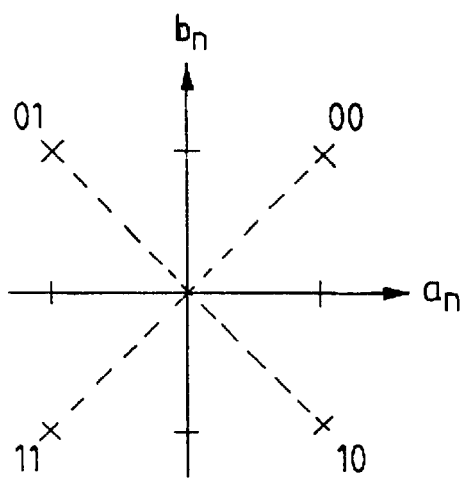
FIG. 3 shows an encoding diagram for QPSK signals, i.e. the principle for Gray encoding.

Before reaching the transmitter 26, the digital information is randomly encoded in an encoding device 28 which may be part of the transmitter 26 and transmitted to a symbol encoder 29 which splits the digital signals into parts, each part being two bits long and assigns a complex value $a_n \pm jb_n$ to each two bit combination by way of Gray encoding, shown in FIG. 3, so that adjacent phase shifts correspond to a change of only one bit: 00, 0 1, 11, 10. Each two bit combination is called a symbol. In this embodiment QPSK modulation is used, but DPSK (Dual phase Shift Keying), 8PSK (8Phase Shift Keying), QAM (Quadrature Amplitude Modulation) or another set of signals depending on the available signal/noise relationship.

The output terminal of the symbol encoder 29 transmits the real part of the output signal to an "in phase" mixer 30 and the imaginary part of the output signal to a "quadrature phase" mixer 31. The unit 30 has a second input terminal connected to a frequency converter 32, to which the unit 31 is also connected, via a −90° phase displacing means 33.

The system is sensitive to deviations in frequency. A deviation in frequency of only 50 ppm, which is a normal value for crystal controlled oscillators causes the receiver to lose the ability to follow the signal when the phase drifts. Because of this, among other things, the system uses the retrieved carrier wave from the downstream channel to generate the mixed carrier wave for the upstream signal from the subscriber.

The downstream receiver 27 conventionally has a receiver circuit 35, the output of which is connected to an address filter 36, the output of which transmits an outgoing data signal to the subscriber. The receiver circuit 35 receives a data packet from the base station 1. The address filter 36 separates the part of the data packet which is addressed to this downstream receiver 27. This part of the data packet is transmitted to a control processor 37, which controls the frequency converter 32. In addition to information about the allocated carrier frequency, the data packet may comprise information telling a transmitter with a weak output signal to increase its transmission power, and a transmitter with a strong output signal to decrease its transmission power, or information about a predefined delay for each transmission. The frequency converter 32 is connected to the receiver circuit 35 and extracts clock and control signals from a downstream carrier wave $f_c$.

The signals from each mixer 30 and 31 which have been modulated onto the upstream carrier wave are added together in an adder 38. As the carrier waves transmitted to the mixers 30 and 31 respectively, are mutually orthogonal, the resulting carrier wave from the adder 38 also has two parts, which are mutually orthogonal. The digital output signal from the adder 38 is DA converted in a DA converter 39 with a clock controlled sampling frequency $f_s$ obtained from the unit 32 in the downstream receiver 27. After DA conversion of the digital signals, an interval of the analogue signal corresponding to a digital two bit combination, is called a signal unit or a symbol. Thus, the symbol after DA conversion is the corresponding analogue symbol to the digital symbol with an extension in time corresponding to the time of the digital symbol. The analogue signals are bandpass filtered in a bandpass filter 40 before they are converted from the IF band to the RF band in a converter 141, which may be part of the transmitter 26 from which the signals are transmitted to the base station 1. The converter 141 is connected to the frequency converter 32, from which it receives a reference frequency $f_r$ for the conversion.

The Receiver in the Base Station

Figure 4:
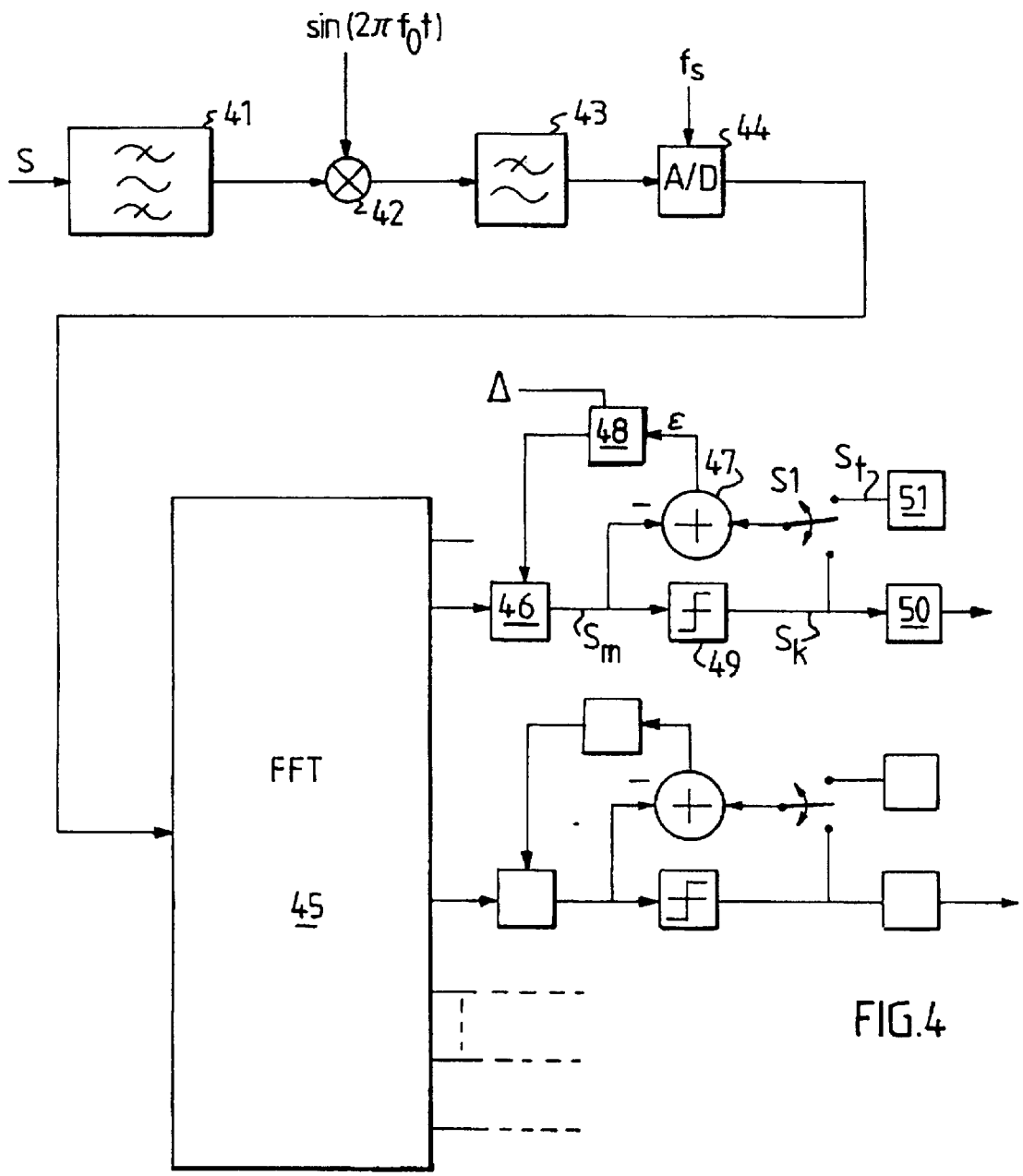
FIG. 4 shows the construction of a receiver in the base station.

FIG. 4 shows the construction of a receiver in the base station 1. The receiver simultaneously receives the signals from the subscribers' transmitters as a broadband signal to be separated with a common algorithm.

In the preferred embodiment this common algorithm is an FFT (Fast Fourier Transform), but it can also be another suitable algorithm. The received signals S are band limited by means of a bandpass filter 41, whereafter they are mixed, by means of a mixer 42, with a carrier wave, the frequency of which is the same as a base frequency $f_0$, which is the lowest frequency used by the subchannel package. The mixed signals are lowpass filtered by means of a lowpass filter 43 and AD converted by means of an AD converter 44. The digital information is then transmitted to an FFT computation block 45.

The FFT

The FFT computation block 45 receives data from the AD converter 44 and computes an FFT (Fast Fourier Transform) of the received data in the conventional way. The time interval during which the FFT is computed each time is called an FFT window. The length of this interval is selected to encompass an integer number of periods for any of the carrier waves and so that the FFT is computed on N samples of input data, where $N=2^n$, n being an integer number. This allows for the use of a quick radix-2 FFT.

The FFT separates each upstream channel and feeds the information via a channel to an adaptive equalizer block 46. The output terminal of the equalizer block 46 is connected to a decision block 49 and to a computing device 43 via an adder 47 for compensation in the equalizer block 46 of changes in phase and amplitude caused by the transfer function of the channel. To determine the appearance of these changes, each transmission is started with a sequence of symbols which is known to the receiver. A selector switch S1 is then set to connect a practising block 51 to the adder 47. For each of the symbols the error is computed as a difference E between the actual received symbol $S_m$ on the output of the equalizer block and the known practising symbol $S_t$ taken from the practising block 51. This difference is computed by the adder 47. The computing device 48 minimizes the difference through the least squares method with a step Δ which may be obtained from any of the devices of the base station and affects the adaptive equalizer block 46. The longer the practising sequence, the better the error compensation will be. After the practising sequence has been completed, the selector switch S1 is set to connect the output of the decision block 49 to the adder 47 and a decision feedback is obtained, in which the computing device 48 continuously minimizes the difference between the received symbol $S_m$ and a decoded symbol $S_k$ on the output of the decision block 49.

Figure 5:
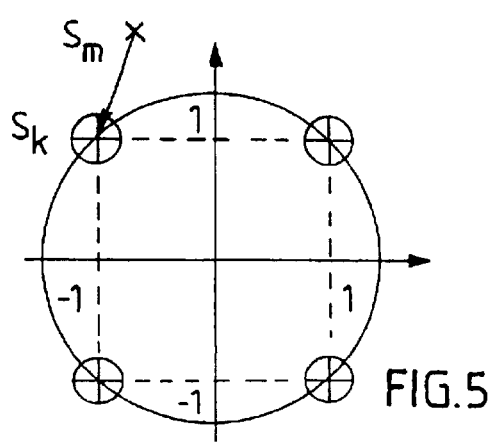
FIG. 5 shows a decision diagram for QPSK signals, i.e. the principle for decoding the Gray encoded symbols.

The decision block 49 decodes the symbols according to the diagram shown in FIG. 5. A received symbol $S_m$ is translated to the closest known symbol $S_k$. The symbols decoded in this way make up the digital information which is transmitted upstream via transmitter block 50.

Frequency Allocation

Figure 6A:
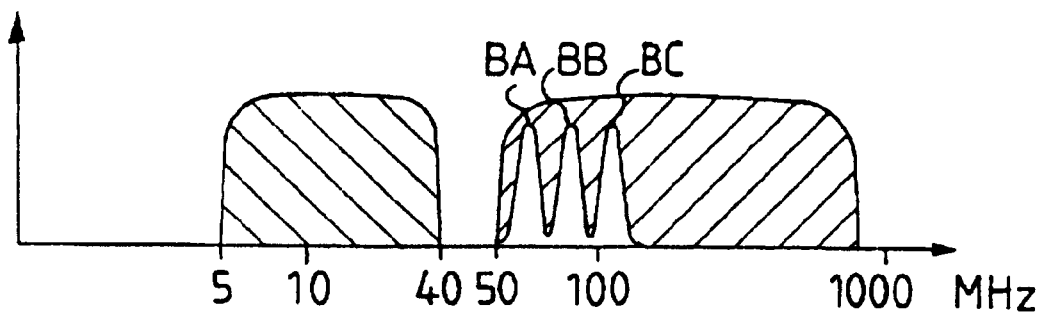
FIG. 6A shows frequency band allocation for cable TV.

FIG. 6A describes the frequency band allocation for cable TV. The base station 1 comprises devices 60 for subchannel allocation. For upstream transmission of different kinds of interactive TV, mail order and other services, the frequency band 5–40 MHz has been reserved, and for downstream transmission the band from 50 MHz and up is used. Within these frequency bands the spectrum is divided into individual bands, e.g. BA, BB, BC, for individual cable TV channels. In FIG. 6A this is shown for the down stream band 50 MHz and up, but the same is valid for the upstream band 5–40 MHz.

Figure 6B:
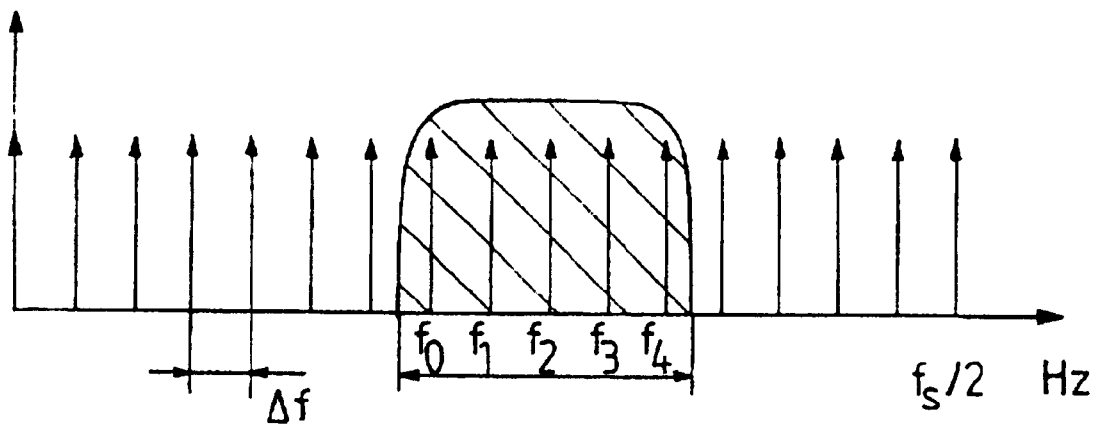
FIG. 6B shows subchannel allocation within a cable TV channel.

FIG. 6B shows subchannel allocation within a cable TV channel. This allocation is achieved through splitting the frequency spectrum between 0 Hz and half the sampling frequency $f_s/2$ into a number of frequencies $f_n$, which number equals $2^x$, x being an integer number, and which frequencies are all multiples of a base frequency $f_0$, with the interval Δf. The frequencies within the cable TV channel to be used, $f_0$, $f_1$, $f_2$, $f_4$, are then used as carrier waves for the upstream transmission from the subscribers, that is, a unique carrier frequency is assigned to each of the subscriber transmitters. The carrier frequencies are selected to be orthogonal.

Figure 6C:
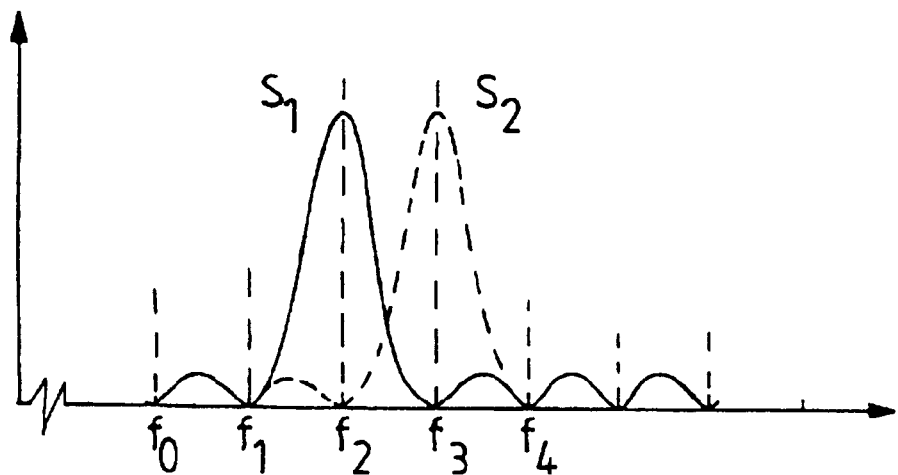
FIG. 6C illustrates the frequency spectrum for two mutually orthogonal signals.

FIG. 6C illustrates the frequency spectrum for two orthogonal signals $s_1$, $s_2$ with a centre frequency $f_2$, and $f_3$ respectively. The subchannels, the carrier frequencies of which have been chosen according to the above, may be detected simultaneously with the use of an FFT because the splitting of the frequency band has been carried out in such a way that the signals are orthogonal. The meaning of the term orthogonal signals will be explained below.

If strong disturbances make it impossible to use parts of the frequency band, the system can reallocate the affected subscribers to other parts of the frequency band. A subscriber requiring more bandwidth can get more frequencies assigned to him, however, this requires that the subscriber can transmit on several frequencies simultaneously, e.g. with more than one QPSK transmitter. A reallocation or assigning of more frequencies to a user is done, when applicable, in the device 60 for subchannel allocation found in the base station.

Orthogonality

Two signals $s_1(t)$ and $s_2(t)$ with the centre frequencies $f_2$ and $f_3$ respectively are said to be orthogonal if the fulfill the condition $$\int s_1(t) \times s_2(t)dt = 0 \text{ over the interval } t=0 \text{ to } t=T_{symbol}$$

This means that there is no crosstalk between them and they can be detected independently of each other. To maintain orthogonality they must have a difference in frequency $$\Delta f = 1/T_{symbol}$$

where $T_{symbol}$ equals one symbol period or signal unit, i.e. the segment of the signal in the time plane corresponding to a binary code=symbol. With QPSK modulation, i.e. four phase displacements, the four digital symbols will be 00, 01, 11, 10.

The frequency band from zero to half the sampling frequency is split in $2^n$ intervals, where n is taken sufficiently large to provide N subchannels within the frequency band of the cable TV channel.

The algorithm providing the subchannel allocation is comprised in the device 60 for subchannel allocation in the base station 1 or the network unit 6 and combines a first estimate of the number intervals required with information about the lowest required sampling frequency according to the sampling theorem. If adjustment is needed the number of intervals may be increased and/or the sampling frequency may be increased, so that the subchannels can be extracted in a way suitable for computation of the FFT algorithm.

Figure 7:
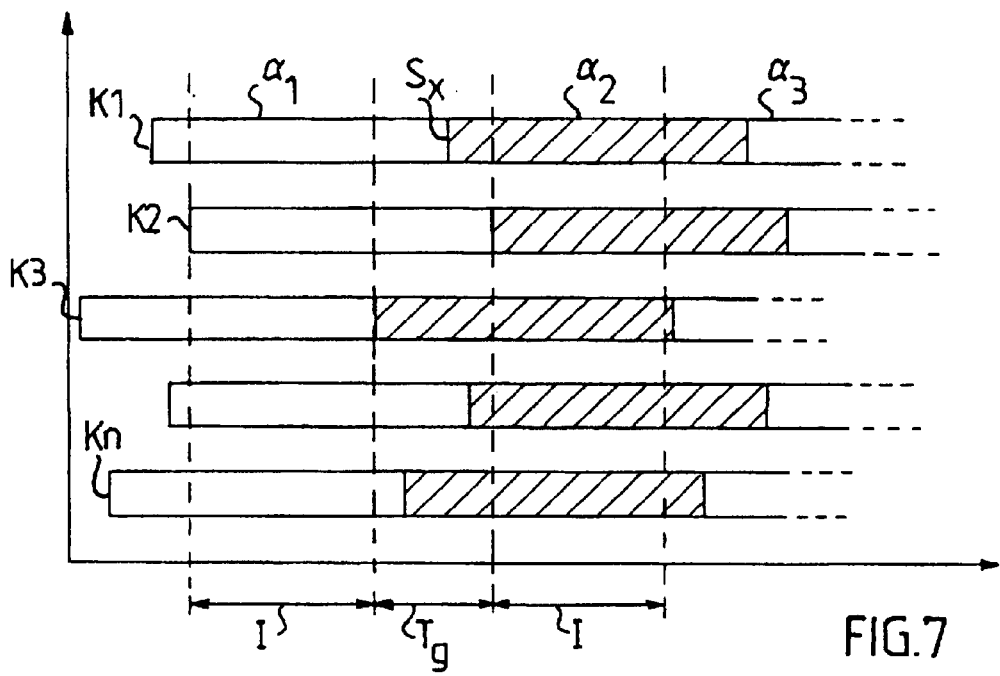
FIG. 7 illustrates subchannels with different delays.

FIG. 7 illustrates subchannels K1, K2, K3, . . . Kn, each of which sends a flow of symbols α1, α2, α3, with different delay on different channels. (The symbols α1, α2, α3 may, but do not have to be, the same.) These delays are caused by the propagation time of the signals from the subscribers to the base station 1. As different subscribers are at different distances from the base station 1, the propagation times differ. For the FFT algorithm to be able to differentiate between the different channels, the symbols sent from different subscribers overlap in a time interval during which the FFT is computed, i.e. no symbol transitions $S_x$ may occur in this interval, which is called an FFT window I. Therefore, a protection period $T_g$ is required between each FFT window, which lowers the possible transmission rate.

The duration of the protection period is determined by a maximum difference in delay $D_m$ between two transmitters. This required protection period in turn causes another problem: the phase of the received symbol varies in a way that can not easily be compensated for by the adaptive equalizers.

The base station 1 comprises devices 81 for computation of the length of the protection period $T_g$ and devices 82 for computation of the number of possible phase displacements and the appearance of the phase displacements, in each separated signal.

Figure 8:
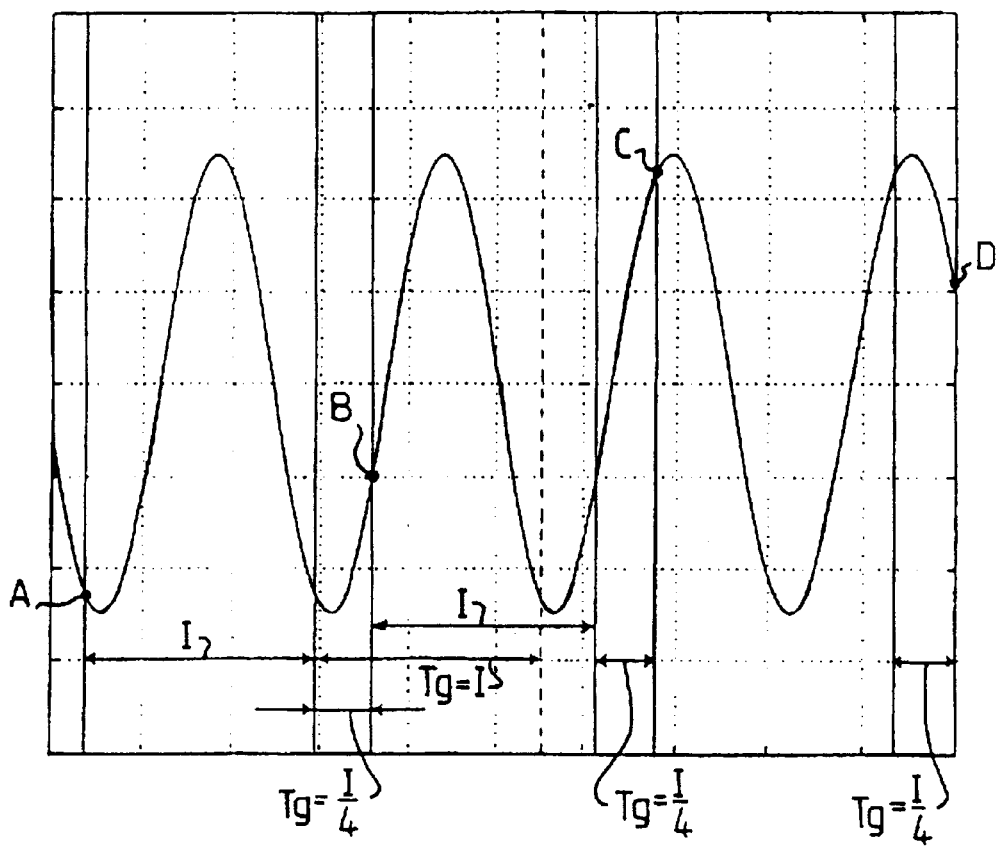
FIG. 8 shows a subchannel repeatedly transmitting the symbol "00"

FIG. 8 shows a subchannel repeatedly sending the symbol "00", which corresponds to the situation in FIG. 7 where the symbols α1, α2, α3 are the same each time. This is not necessarily the case, but it helps make the example more readily understandable. If the protection period $T_g$ is made equally long as the FFT window I, denoted $T_g=I$, the signal only obtains one and the same phase displacement, but then a degree of utilization of only 50% is obtained in the transmission. If the protection period is set to be ¼ of the length of the FFT, shown in the figure as $T_g=I/4$, the phase of the signal at the beginning of each FFT window, the points A, B, C, D, take up four points in the decision space, separated by approximately 90°, that is, the symbol has four different phase displacements and this far exceeds the ability of the adaptive equalizers 46 to compensate, even if a long practising sequence is used. According to this embodiment of the invention the length $T_g$ of the protection period is chosen as $$T_g = I/2^n$$

where I=the length of the FFT and $2^n$ is the maximum number of phase displacements in the received signal at the beginning of the FFT window. Thus, if the protection period is set to ¼ of the length of the FFT, marked out in the figure as $T_g=I/4$, a maximum of four phase displacements are obtained.

Figure 9:
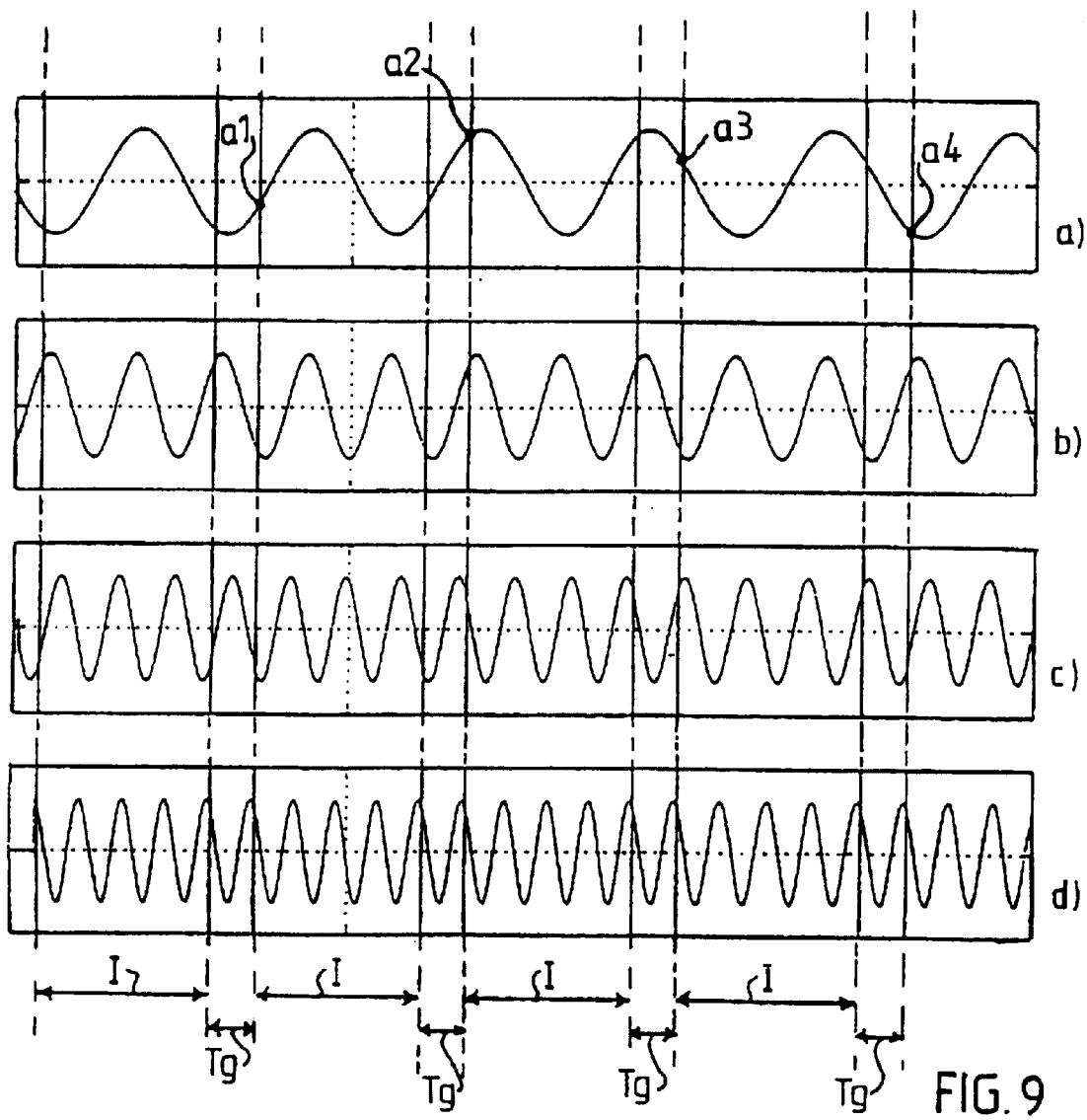
FIG. 9 depicts how four successive subchannels repeatedly transmitting the symbol "00" obtain different numbers of phase displacements because they have different frequencies.

FIG. 9 shows how four successive subchannels repeatedly transmitting the symbol "00" obtains different numbers of phase displacements because they have different frequencies. Channel a) has four phase displacements a1, a2, a3, a4; channel b) has two phase displacements; channel c has four phase displacements and channel d) has one phase displacement. The number of phase displacements on a channel is determined by its frequency and the length of the protection period $T_g$ in relation to the length I of the FFT. The invention exploits this predictable behaviour in phase variations by grouping the symbols that have the same phase displacement in groups and filtering each group using a filter suitable for the phase and attenuation conditions valid for this group. The base station 1 comprises means 83 for grouping the signals according to the number of possible phase displacements and means 84 for cyclic filtering of each group of signals with a given number of filters, ordered into filter banks 70, 76.

Figure 10A:
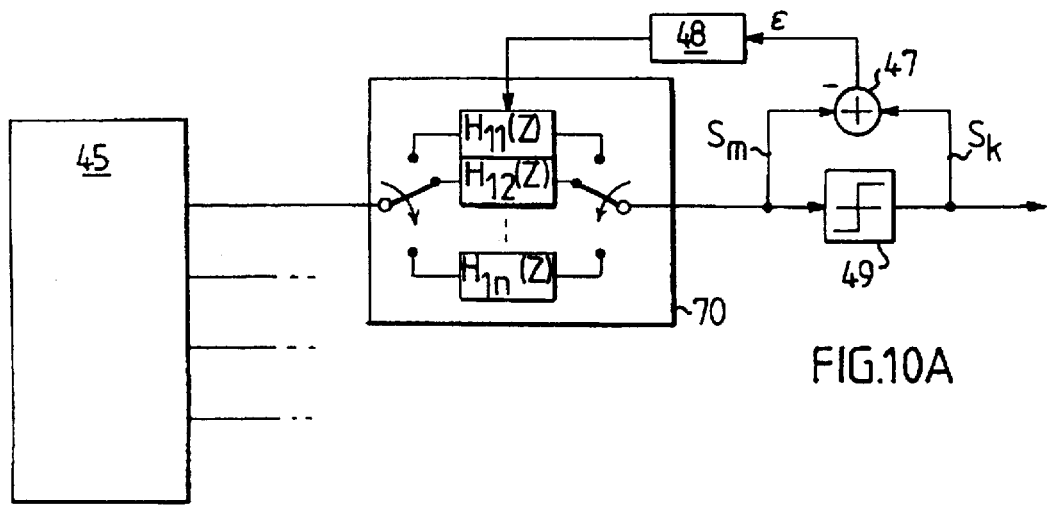
FIG. 10 shows the function of a series of filters, called a filter bank, for four phase displacements.
FIG. 10B shows a possible implementation of a filter bank for a number of phase displacements.

FIG. 10A describes the function of a series of filters, called a filter bank 70, for four phase displacements. The filter bank 70 comprises a series of filters $H_{11}(z)$, $H_{12}(z)$, ..., $H_{1n}(z)$ which are cyclically connected to filter the signals. As the maximum number of phase displacements obtained on a channel, and the order in which these phase displacements occur, are known, this series of different filters can be multiplexed in sequence such that a certain symbol is equalized by the filter which is adapted to its phase shift and attenuation. The filter is then adjusted using the least squares method, and then there is a shift to the next filter while the next symbol is being computed by the FFT. The base station 1 comprises a number of such filter banks. The length of the filter banks, the number of filters, is determined by the maximum number of phase displacements, $2^n$. Each filter $H(z)$ in a filter bank has at least one complex filter coefficient h and is used for a particular phase displacement. The filter coefficient h can be updated using for example the least squares method by means of the computing device 48. The input of the filter bank 70 is connected to the FFT computation block 45 and replaces the conventional adaptive equalizer block 46, shown in FIG. 4. The adder 47, the computing device 48 and the decision device 49 function as described in connection with FIG. 4.

Figure 10B:
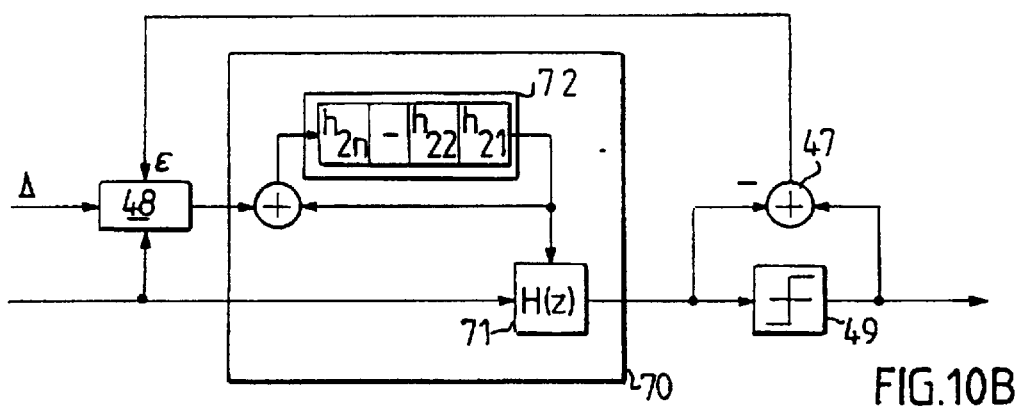

FIG. 10B shows a possible implementation of a filter bank 70 for a number of phase displacements. In figure 10B the filter bank comprises a filter 71, the complex filter coefficient of which is changed cyclically so that a number of different filters are obtained, i.e. the filter bank is made up of one filter 71, the complex filter coefficient is selected cyclically among a number of complex filter coefficients $h_{21}$, $h_{22}$, $h_{2n}$, which are stored in a shift register 72. The shift register 72 is shifted one position for each symbol and each coefficient is adjusted using the least squares method by the computing device 48, with the step length Δ. The adder 47, the computing device 48 and the decision means 49 function as described in connection with FIG. 4.

In the figures 10A and 10B, the practising block 51, the selector switch S1 and the connections associated with these have been left out for clarity, but they are comprised in the embodiment in the same way as described above.

Figure 11:
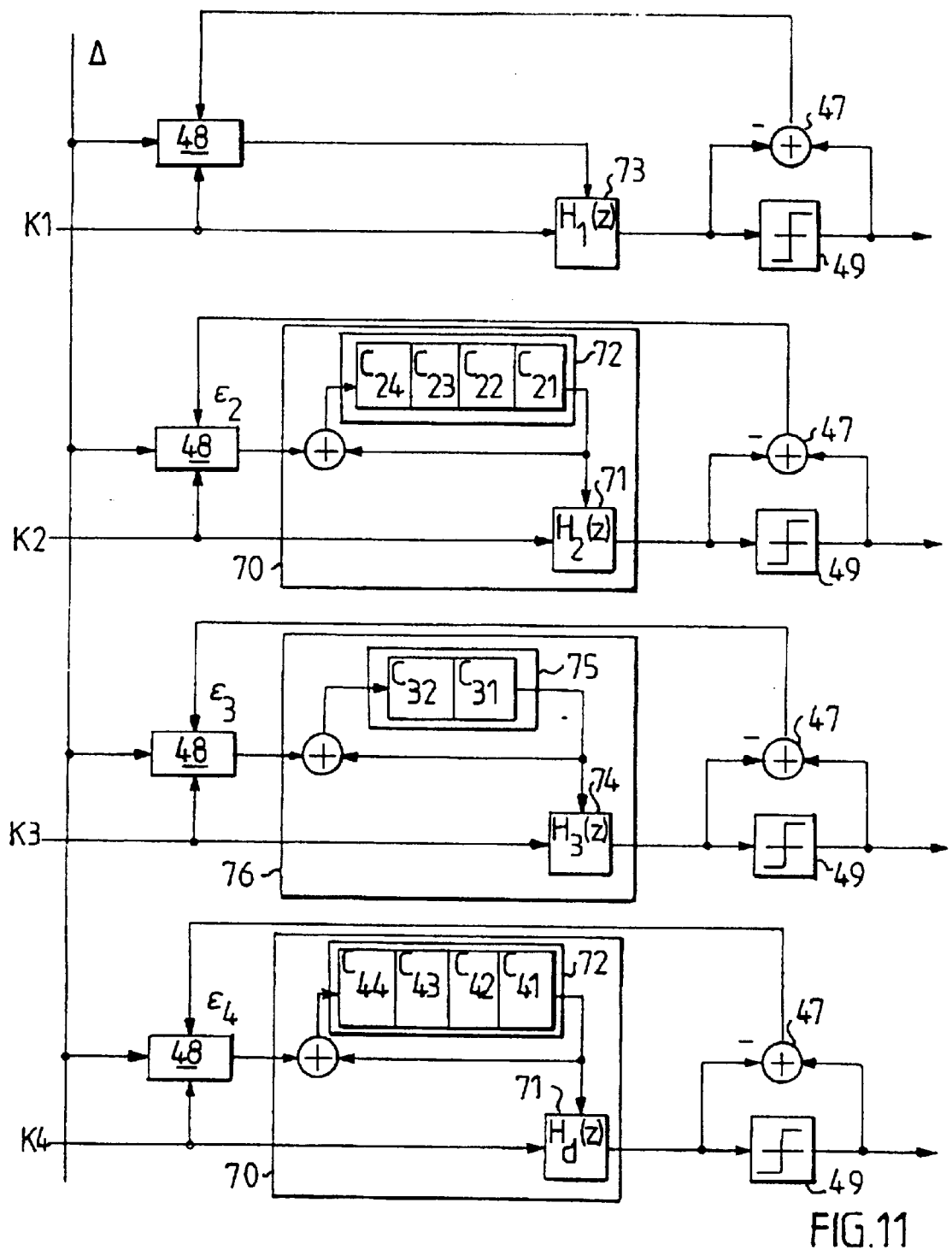
FIG. 11 shows an implemented system with four phase displacements.

FIG. 11 shows an implemented system with four phase displacements. Since the number of phase displacements in each channel is known, the filters of all channels do not need to have a maximum length, which saves memory space. The channels K2 and K4 have four phase displacements and functions in the same way as described in figure 10B. Channel K1 only has one phase displacement and thus only needs one filter 73, the filter coefficient of which only has to be adjusted using the least squares method by means of the computing device 48. Channel K3 has two phase displacements and thus two filter coefficients c32, c31 in its shift register 75 for cyclic connection to the filter 74. The adder 47, the computing device 48 and the decision block 49 function as described in connection with FIG. 4.

In the following, alternative embodiments of the invention will be described. Only the features distinguishing these embodiments from the preferred embodiment are described. In all other aspects, they correspond to the preferred embodiment.

Figure 12:
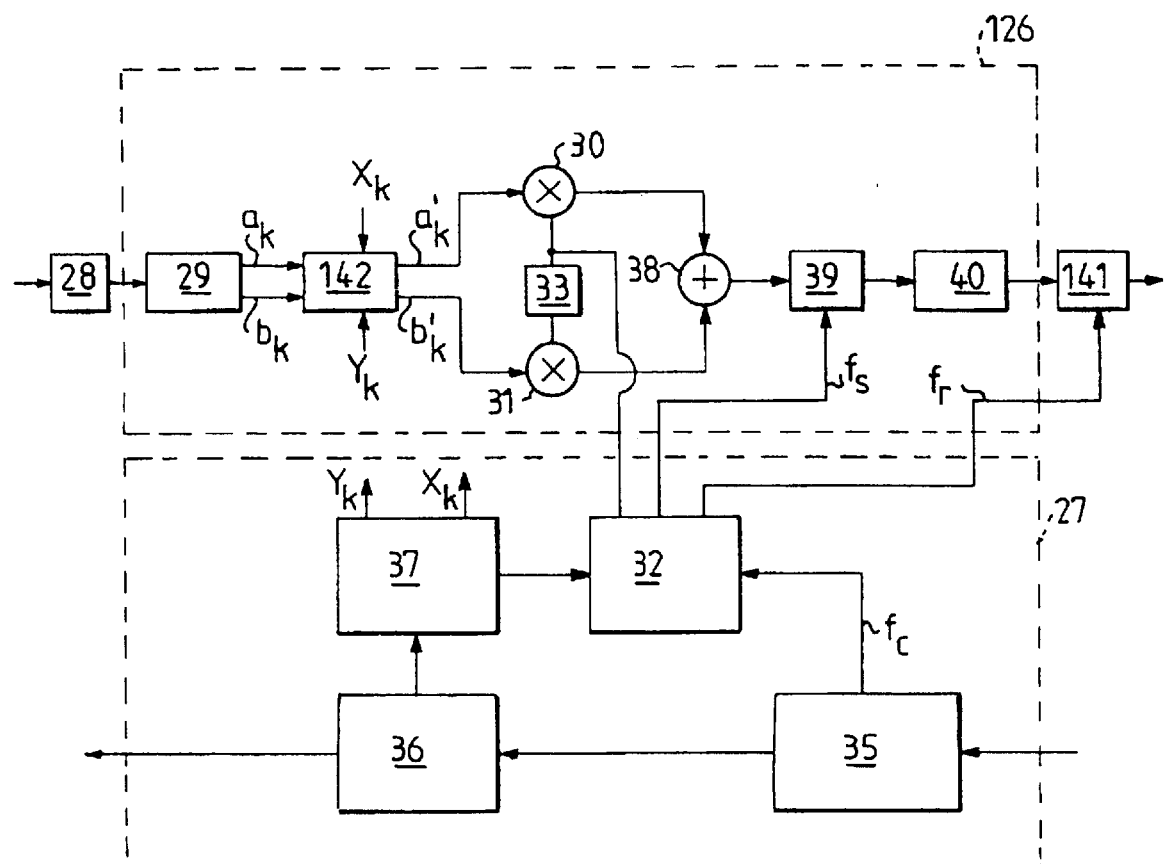
FIG. 12 shows the structure of a QPSK transmitter according to a second embodiment of the invention and relevant parts of a downstream receiver.

FIG. 12 shows a QPSK transmitter 126 according to a second embodiment of the invention and relevant parts of the downstream receiver 27. (Here too, each subscriber can have one or more QPSK transmitters 126.) The QPSK transmitter 126 functions in the same way as the QPSK transmitter 26 in the preferred embodiment, with the addition of one phase compensation means 142. The phase compensation means 142 compensates for the effect of the protection period $T_g$ on the phase displacement of the signal, by restarting the wave form with a phase displacement specific to each symbol after each symbol. In this embodiment, neither grouping nor filtering of the groups with the same filter banks are needed, as all signals reach the receiver of the base station 1 with a phase displacement specific to each symbol.

Figure 13:
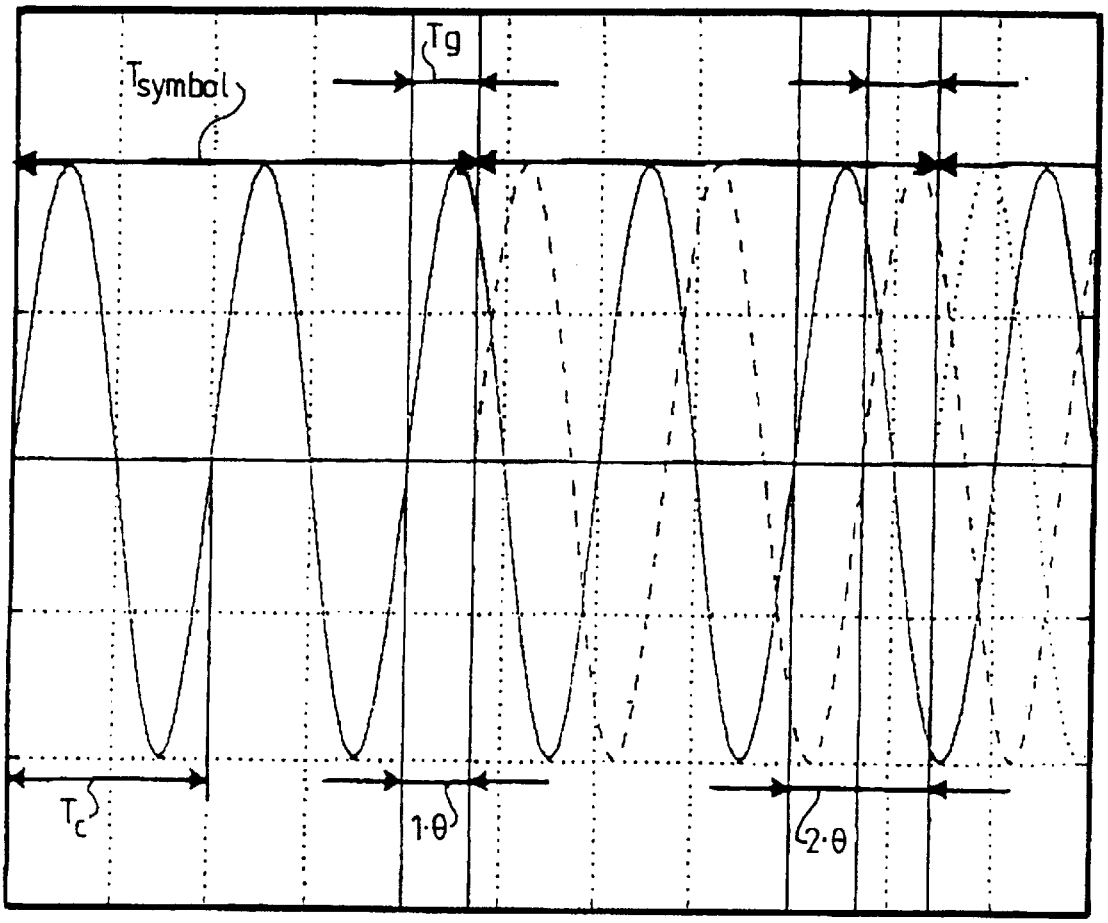
FIG. 13 illustrates how each protection period causes a phase displacement of a certain phase angle.

FIG. 13 illustrates how each protection period $T_g$ displaces the phase by a phase angle $\theta$. $T_g=1/4$ gives four possible phase displacements, the displacement given as:

$$\theta_k = \theta_o + i_k \pi/2 \quad i_k = 0, 1, 2, 3.$$

A phase compensation $\phi_c = 2\pi T_g/T_c$ is then needed, with $T_c = 1/f_c$, i.e. the period of the carrier wave.

In a symbol interval k the signal can be written as:

$$s_k(t) = A \cos(2\pi f_c t + \theta_k - k\phi_c) \quad (K-1)T_{symbol} < t < kT_{symbol} \quad (1)$$

Trigonometric development gives:

$$s_k(t) = A \cos(\theta_k - k\phi_c)\cos(2\pi f_c t) - A \sin(\theta_k - k\phi_c)\sin(2\pi f_c t) \quad (2)$$

Further trigonometric development and the substitutions $$a_k = \cos\theta_k \; x_k = \cos(k\phi_c)$$

$$b_k = \sin\theta_k \; y_k = \sin(k\phi_c) \text{ give:}$$

$$s_k(t) = A[a_k x_k + b_k y_k]\cos(2\pi f_c t) - A[b_k x_k - a_k y_k]\sin(2\pi f_c t) \quad (3)$$

Substituting $A[a_k x_k + b_k y_k] = a_k'$ and $A[b_k x_k - a_k y_k] = b_k'$ gives:

$$s_k(t) = a_k' \cos(2\pi f_c t) - b_k' \sin(2\pi f_c t) \quad (4)$$

Figure 14:
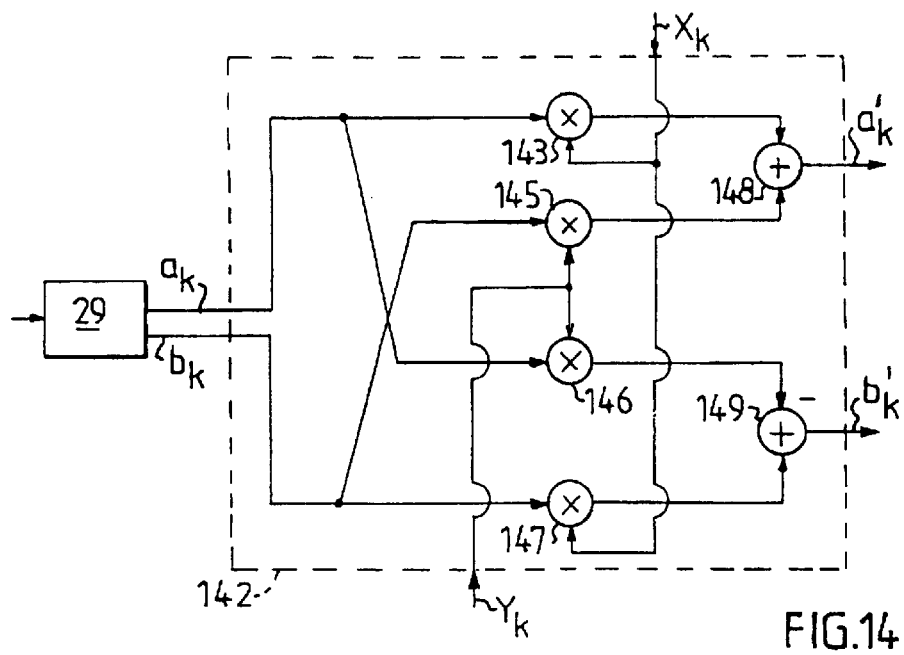
FIG. 14 shows how a phase compensation device can be implemented according to a second embodiment.

FIG. 14 shows how equation 4 can be implemented in the phase compensation device 142. The symbol encoder 29 splits the digital signal into two bit parts and assigns a complex value $a_k \pm jb_k$ to each two bit combination corresponding to $a_n \pm jb_n$, described in connection with FIG. 3. The real component $a_k$ is fed to a mixer 143, in which it is mixed with a value $x_k$ and to a mixer 146 in which it is mixed with a value $y_k$. The imaginary component $b_k$ is fed to a mixer 147 in which it is mixed with a value $x_k$ and to a mixer 145 in which it is mixed with a value $y_k$. The values $x_k$ and $y_k$ are obtained from the control processor 37. The output signals from the mixer 143 and the mixer 145 are added in an adder 148 on the output of which $a_k'$ is obtained. The output signals from the mixer 146 and the mixer 147 are added in an adder 149 on the output of which $b_k'$ is obtained. The real and imaginary components $a_k'$ and $b_k'$, phase compensated in this way, are then fed on to the mixer 30 and the mixer 31 respectively (see FIG. 12).

Figure 15:
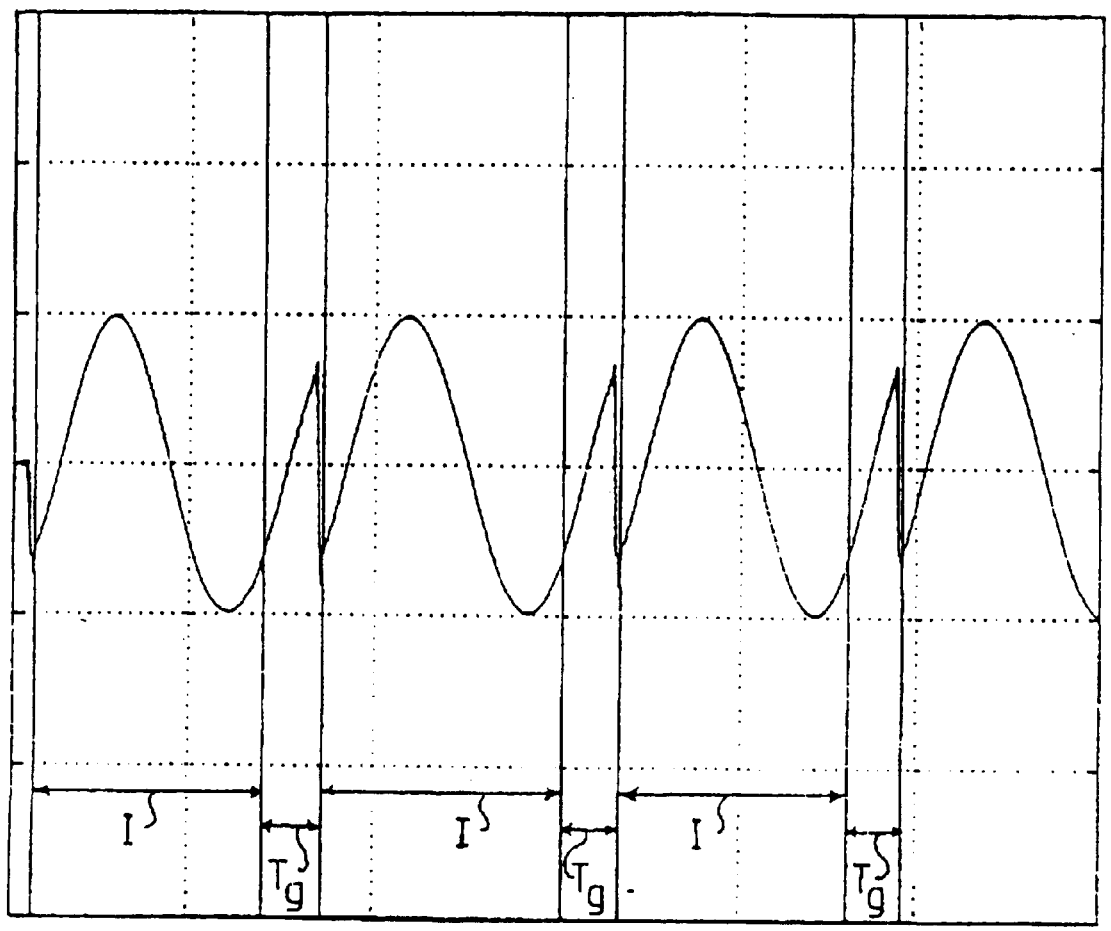
FIG. 15 shows a signal with a discontinued phase.

FIG. 15 shows a signal with a discontinued phase according to equation 4. A discontinued phase here means that the phase is not continuous while a flow of similar symbols are being transmitted. Such a waveform can be generated with the QPSK transmitter 126 of FIG. 12.

Figure 16A:
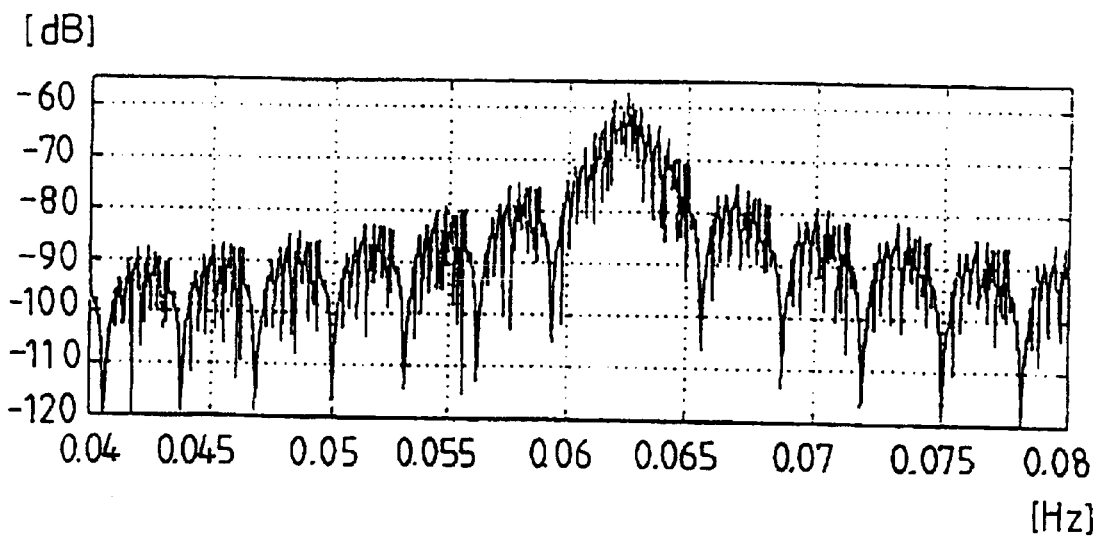
FIG. 16A shows a spectral distribution for a signal having a continuous phase.
Figure 16B:
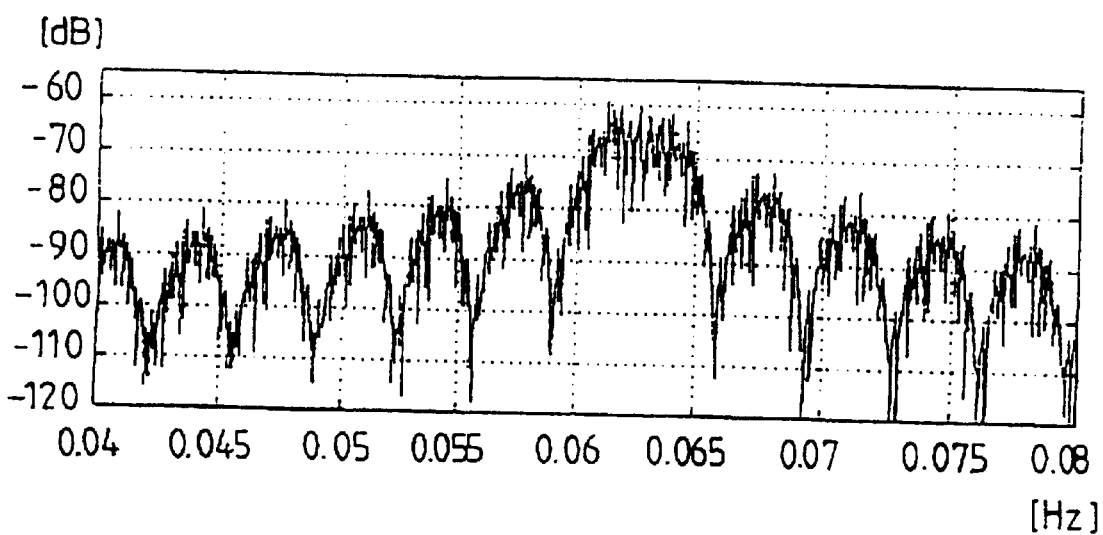
FIG. 16B shows a spectral distribution for a signal having a discontinued phase.

FIG. 16A shows a spectral distribution for a signal with a continued phase, and FIG. 16B shows a spectral distribution for a signal with a discontinued phase, both signals shown as a function of a standardized frequency. It might be expected that the spectral distribution of this type of signal would be more difficult to handle, but simulations have shown that the difference is not so bin. This is seen in FIGS. 16A and 16B.

According to a third embodiment of the invention, the base station 1 can control the QPSK transmitter 26 of each subscriber so as to delay each transmission by a predefined time so that all transmissions will reach the receiver in the base station 1 at the same time and with a phase displacement specific to each symbol. In this embodiment no protection period is needed, and thus no phase error of the kind that arise in the preferred embodiment occurs, i.e. phase compensation or grouping and filtering of the groups using the same filter banks are not needed, as all signals reach the receiver of the base station with a phase displacement specific to each symbol.

The means 81 for computing the protection period $T_g$ and the means for computing the number and appearances of the phase displacements, both of which are found in the base station 1, then provide information for each QPSK transmitter 26 regarding the necessary delay of the upstream transmission. This information may, for example, be combined with the information about the frequency allocation and transmitted to the downstream receiver 27 of each subscriber, in which the control processor 37 will provide the delay.

In the preferred embodiment described in connection with FIGS. 1–11 the conversion between optic and electric signals takes place in the network unit 6, but in another embodiment, the whole network may be optic. Amplifiers and outlet devices may then be optic ones and the transmissions made with, for example, one wavelength for each subscriber, which wavelengths are mutually correlated in such a way that all transmitters can be received and separated simultaneously by at least one common algorithm, e.g. at least one FFT. Intermediate solutions are also possible, where a larger part of the network than in the preferred embodiment is optic without the whole network being optic.

What is claimed is:

1. Method for transmitting and receiving information over a cable TV network comprising at least one base station connected to a branched cable network branching outward from the base station to at least two subscribers provided with transmitters, the method comprising the steps of:

assigning a unique carrier frequency to each of the subscribers' transmitters;

selecting the carrier frequencies to be mutually orthogonal;

transmitting signals from the subscribers' transmitters simultaneously, receiving the signals in the base station as a broadband signal and separating the signals with at least one common algorithm;

introducing a protection period between transmitted symbols, the duration of said protection period forming a predefined part of the duration of the part of the algorithm separating the signals from the different subscribers' transmitters; and using the relationship between the duration of the protection period and the duration of the part of the algorithm separating the signals from the different subscribers' transmitters to determine a number of possible phase displacements. and the appearance of the phase displacements, for each separated signal.

2. Method according to claim 1, wherein the common algorithm comprises the computation of at least one Fast Fourier Transform (FFT).

3. Method according to claim 2, further comprising the following steps:

computing a protection period, which has a duration forming a predefined part of the duration of the part of the algorithm that separates the signals from the different subscribers' transmitters;

using the relationship between the duration of the protection period and the duration of the part of the algorithm separating the signals from the different subscribers' transmitters to determine a number of possible phase displacements and the appearance of the phase displacements, for each separated signal; and phase compensating signals intended for upstream transmission, towards the base station in each subscriber's transmitter so that all signals obtain the same phase displacement.

4. Method according to claim 2, further comprising the following steps:

computing a suitable delay for each subscriber; and allowing each subscriber's transmitter to transmit after the computed, suitable delay for the subscribers' transmitter.

5. Method according to claim 1, further comprising the following steps:

grouping the symbols according to the number of possible phase displacements;

filtering each group of symbols cyclically using a predefined number of filters; and determining the number of filters for each group of symbols from the number of phase displacements for the group.

6. Apparatus for transmitting and receiving information in a cable TV network with at least one device connected to a branched cable network branching out to at least two subscribers provided with transmitters, the apparatus comprising:

means for allocating a unique carrier frequency to each subscriber transmitter, the carrier frequencies being orthogonal;

means for simultaneous reception of signals from every subscriber's transmitter as a broadband signal and separation of the signals using at least one common algorithm;

means for calculating the duration of a protection period between transmitted symbols; and means for calculating a number of different phase displacements and the appearance of the phase displacements for each separated signal.

7. Apparatus according to claim 6, wherein the receiving devices further comprise a calculating device for at least one Fast Fourier Transform (FFT).

8. Apparatus according to claim 6, further comprising:

means for grouping the signals according to the number of possible phase displacements; and means for cyclically filtering each group of signals using a predefined number of filters, said number of filters for each group being determined by the number of phase displacements for the group.

9. Apparatus for transmitting and receiving information in a cable TV network with at least one device connected to a branching cable network branches out towards at least two subscribers provided with transmitters comprising phase compensation means, said apparatus comprising:

means for allocation of a unique carrier frequency to each subscriber's transmitter, said carrier frequencies being orthogonal;

means for simultaneous reception of signals from every subscriber's transmitter as a broadband signal and separation of the signals using at least one common algorithm;

means for calculating the duration of a protection period between transmitted symbols; and means for calculating a number of possible phase displacements, and the appearance of the phase displacements, for each separated signal.

10. Apparatus according to claim 9, wherein the receiving means comprise calculating means for at least one Fast Fourier Transform (FFT).

* * * * *